US012676541B2

(12) United States Patent
Zheng et al.

(10) Patent No.: US 12,676,541 B2
(45) Date of Patent: Jul. 7, 2026

(54) INTERLEAVED FLYING CAPACITOR MULTI-LEVEL CONVERTER AND OPERATING METHOD THEREOF

(71) Applicant: DELTA ELECTRONICS, INC., Taoyuan City (TW)

(72) Inventors: You-Rui Zheng, Taoyuan City (TW); Jui-En Chang, Taoyuan City (TW); Wei-Cheng Cheng, Taoyuan City (TW); Wei-Yu Liu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 179 days.

(21) Appl. No.: 18/807,390

(22) Filed: Aug. 16, 2024

(65) Prior Publication Data

US 2025/0293581 A1 Sep. 18, 2025

(30) Foreign Application Priority Data

Mar. 14, 2024 (CN) .......................... 202410290319.6

(51) Int. Cl.
H02M 1/00 (2007.01)
H02M 1/42 (2007.01)
H02M 1/14 (2006.01)

(52) U.S. Cl.
CPC ....... H02M 1/0043 (2021.05); H02M 1/0095 (2021.05); H02M 1/4208 (2013.01); *H02M 1/14* (2013.01)

(58) Field of Classification Search
CPC ............. H02M 1/0043; H02M 1/0095; H02M 1/4208; H02M 1/14
See application file for complete search history.

(56) References Cited

U.S. PATENT DOCUMENTS 10,886,832 B2 * 1/2021 Yoscovich ............. H02M 7/483
11,545,912 B2 * 1/2023 Yoscovich .......... H02M 7/4837
(Continued)

FOREIGN PATENT DOCUMENTS

CN 109560727 A 4/2019
CN 112448579 A 3/2021
(Continued)

OTHER PUBLICATIONS

Ma, Qingxuan et al "Dual-Loop High Speed Voltage Balancing Control for High Frequency Four-level GaN Totem-Pole PFC With Small Flying Capacitors", 2020 IEEE Energy Conversion Congress and Exposition (ECCE), IEEE, Oct. 11, 2020, pp. 6218-6225, Figs. 1-4, table.
(Continued)

*Primary Examiner* — Rafael O De Leon Domenech
(74) *Attorney, Agent, or Firm* — MUNCY, GEISSLER, OLDS & LOWE, P.C.

(57) ABSTRACT

An interleaved flying capacitor multi-level converter includes a plurality of arms and a phase-shift PWM generation circuit. Each arm includes a flying capacitor multi-level circuit having an upper arm and a lower arm coupled at a middle node. The upper arm includes a plurality of serially coupled upper arm switches and the lower arm includes a plurality of serially coupled lower arm switches. One capacitor is correspondingly coupled between every two upper arm switches and every two lower arm switches. The phase-shift PWM generation circuit generates a plurality of switch control signals to respectively control the plurality of upper arm switches and the plurality of lower arm switches.

13 Claims, 10 Drawing Sheets

(56) References Cited

U.S. PATENT DOCUMENTS

| 11,962,249 B2 * | 4/2024 | Abdelhamid ....... H02M 7/4837 |
| 12,047,005 B2 | 7/2024 | Chou et al. |
| 2014/0159481 A1 | 6/2014 | Berger |
| 2015/0062984 A1 | 3/2015 | Hu et al. |
| 2015/0280608 A1 | 10/2015 | Yoscovich et al. |
| 2016/0329832 A1 | 11/2016 | Aeloiza et al. |
| 2019/0097553 A1 | 3/2019 | Sun et al. |
| 2021/0067042 A1 | 3/2021 | Liu et al. |
| 2021/0218342 A1 | 7/2021 | Zmood et al. |
| 2022/0224244 A1 | 7/2022 | Tamasas Elrais |
| 2025/0158553 A1 * | 5/2025 | Prasad .................... H02P 27/08 |

FOREIGN PATENT DOCUMENTS

| EP | 3852261 A1 | 7/2021 |
| JP | 2020022257 A | 2/2020 |
| TW | 1796013 B | 3/2023 |

OTHER PUBLICATIONS

Xiong, Kun et al, "5-Level Flying Capacitor Bridgeless PFC Converter Using Cost-Effective Low-Voltage GaN Transistors" 2019 IEEE Energy Conversion Congress and Exposition (ECCE), IEEE, Sep. 29, 2019, pp. 187-192, Figs. 1b. 2d.

Bulut, Enis Baris et al, "A 3700 W Ultra Low Profile Single-Phase Multi-level Totem-Pole PFC", 2024 IEEE Applied Power Electronics Conference and Exposition (APEC), IEEE, Feb. 25, 2024, pp. 1954-1961; abstract, Figs. 1, 9.

Search Report dated Jan. 29, 2025 of the corresponding EP patent application No. 24194704.3.

Search Report dated Dec. 9, 2024 of the corresponding PCT patent application No. PCT/CN2024/081772.

* cited by examiner

INTERLEAVED FLYING CAPACITOR MULTI-LEVEL CONVERTER AND OPERATING METHOD THEREOF

BACKGROUND

Technical Field

The present disclosure relates to a power converter and an operating method thereof, and more particularly to an interleaved flying capacitor multi-level converter and an operating method thereof.

Description of Related Art

In current power converters, an interleaved method is often used to control switches of a plurality of bridge arms to fulfill the high-power consumption applications. FIG. 1 shows a circuit diagram of an interleaved boost power factor correction (PFC) circuit, and FIG. 2 shows a circuit diagram of an interleaved Totem-Pole PFC circuit.

In current interleaved power converters, in order to reduce the ripple of the input current, the PWM signals of the switches on the two bridge arms of the power converter are interleaved by 180 degrees. As shown in FIG. 1, the signals PWM1 and PWM2 that respectively control the switches Q1 and Q2 of the two bridge arms are interleaved by 180 degrees. For example, a starting time of the PWM1 with a high level is set to zero degree and a staring time of the PWM2 with a high level is set to 180 degrees, and a time length of the PWM1 with the high level is substantially equal to a time length of the PWM2 with the high level. Alternatively, as shown in FIG. 2, the signals PWM3 and PWM4 that respectively control the switches Q3 and Q4 of the two bridge arms are interleaved by 180 degrees. For example, as mentioned above, the PWM3 is zero degree and the PWM4 is 180 degrees. Therefore, the peaks and valleys of the currents $I_{L\_a}$, $I_{L\_b}$ flowing through the two inductors are interleaved by 180 degrees, thereby reducing the ripple of the total input current $I_{total}$ ($I_{total}=I_{L\_a}+I_{L\_b}$).

With the recent increase in demand for high-power, high-efficiency products, many new circuit structures are gradually emerging in order to break through the limitations of existing circuit structures. In particular, a flying capacitor multi-level circuit may be used in power factor correctors or other power converters.

Please refer to FIG. 3, which shows a schematic circuit diagram of the flying capacitor multi-level circuit. An upper arm of the flying capacitor multi-level circuit includes a plurality of switches $S_{1a}$, $S_{2a}$ ... $S_{na}$ connected in series, and a lower arm of the flying capacitor multi-level circuit includes a plurality of switches $S_{1b}$, $S_2b$ ... $S_nb$ connected in series, and a plurality of corresponding capacitors $C_1$, $C_2$ ... $C_{(n-1)}$ are connected between nodes on the upper arm and nodes on the lower arm, that is, a capacitor $C_1$ is connected between a node between a switch $S_{1a}$ and a switch $S_{2a}$ and a node between a switch $S_{1b}$ and a switch $S_{2b}$, and so on. The number of levels of the flying capacitor multi-level circuit is determined according to how many potentials may be generated by the 2×n switches $S_{1b}$ ... $S_{nb}$ and switches $S_{1a}$ ... $S_{na}$ at a middle node N where the switch $S_{1b}$ and the switch $S_{1a}$ are connected. In other words, if the middle node of the flying capacitor multi-level circuit can generate three potentials, the number of levels is 3; if it can generate five potentials, the number of levels is 5, and so on. As shown in FIG. 3, the number of levels of the flying capacitor multi-level circuit is n+1. The flying capacitor multi-level circuit may be used in higher wattage applications, but an interleaved circuit structure may be used to disperse the energy base on considering factors such as switch current endurance and temperature performance.

When using phase-shift pulse width modulation (PSPWM) technology to control the switches of the flying capacitor multi-level circuit, phase differences between switches in the same bridge arm are determined by a formula of $$Phase = \frac{360°}{L-1},$$

where Phase is the angle to be phase-shifted and L is the number of levels of the flying capacitor multi-level circuit. As shown in FIG. 4, the number of levels of the flying capacitor multi-level circuit is 4 and the Phase=180 degrees calculated based on the above-mentioned formula. Therefore, a phase angle difference between the control signals of the switch $S_{1A\_a}$ and the switch $S_{1B\_a}$ of bridge arm a is 180 degrees, and a phase angle difference between the control signals of the switch $S_{2A\_a}$ and the switch $S_{2B\_a}$ of bridge arm a is 180 degrees; a phase angle difference between the control signals of the switch $S_{1A\_b}$ and the switch $S_{1B\_b}$ of bridge arm b is 180 degrees, and a phase angle difference between the control signals of the switch $S_{2A\_b}$ and the switch $S_{2B\_b}$ of bridge arm b is 180 degrees. In the interleaved structure mentioned above, in order to make the peaks and valleys of the current interleaved, the switch control signals of the switches of the bridge arm a and the corresponding switches of the bridge arm b are also interleaved by 180 degrees. According to this concept, the manner of controlling switch control signals shown in FIG. 5 can be acquired.

However, according to the output of the circuit in FIG. 5, it was found that the peaks and valleys of an inductor current $I_{L\_a}$ and an inductor current $I_{L\_b}$ are not interleaved by 180 degrees as expected so that the ripple of the total input current $I_{total}$ cannot be reduced with this type of PSPWM control scheme.

Therefore, how to solve the problems and technical bottlenecks in the existing technology has become a critical topic in this field.

SUMMARY

The present disclosure provides an interleaved flying capacitor multi-level converter which supplies power to a load according to a power source. The interleaved flying capacitor multi-level converter includes a first bridge arm, a second bridge arm, and a phase-shifted pulse width modulation signal generation circuit. The first bridge arm includes a first flying capacitor multi-level circuit, the first flying capacitor multi-level circuit includes a first middle node configured to couple to the power source, a first upper arm having n first upper arm switches, a first lower arm having n first lower arm switches, and (n−1) capacitors respectively coupled to the first upper arm and the first lower arm; a first terminal of the first upper arm is configured to couple to the load, and a second terminal of the first upper arm is coupled to the first middle node; a first terminal of the first lower arm is coupled to the first middle node, and a second terminal of the first lower arm is configured to couple to the load. The second bridge arm includes a second flying capacitor multi-level circuit, the second flying capacitor multi-level circuit includes a second middle node configured to couple to the power source, a second upper arm having n second upper arm switches, a second lower arm having n second lower arm switches, and (n−1) capacitors respectively coupled to the second upper arm and the second lower arm; a first terminal of the second upper arm is configured to couple to the load, and a second terminal of the second upper arm is coupled to the second middle node; a first terminal of the second lower arm is coupled to the second middle node, and a second terminal of the second lower arm is configured to couple to the load. The phase-shifted pulse width modulation signal generation circuit generates a plurality of switch control signals to respectively control the plurality of upper arm switches and the plurality of lower arm switches. Where n is a positive integer greater than 1. The phase-shifted pulse width modulation signal generation circuit generates n first upper arm switch control signals for controlling the n first upper arm switches and n first lower arm switch control signals for controlling the n first lower arm switches, and a phase angle difference between each first upper arm switch control signal and the corresponding first lower arm switch control signal is 180 degrees. The phase-shifted pulse width modulation signal generation circuit generates n second upper arm switch control signals for controlling the n second upper arm switches and n second lower arm switch control signals for controlling the n second lower arm switches, and a phase angle difference between each second upper arm switch control signal and the corresponding second lower arm switch control signal is 180 degrees. A phase angle difference between the h-th first upper arm switch and the 1st first upper arm switch is $(h-1) \times \theta 3$, where h is a positive integer and $1 < h <= n$, $$\theta 3 = \frac{360°}{(L-1)},$$

L is the number of levels of the first flying capacitor multi-level circuit and L=n+1. A phase angle difference between the i-th second upper arm switch and the i-th first upper arm switch is $\theta 1$, where i is a positive integer and $1 \leq i \leq n$, $\theta 1$ is not equal to $$\Delta phaseX = y \times \left(\frac{360°}{L-1}\right),$$

$y=1, 2, \ldots (L-2)$.

The present disclosure also provides an interleaved flying capacitor multi-level converter which includes a plurality of bridge arms and a phase-shifted pulse width modulation signal generation circuit. Each bridge arm is a flying capacitor multi-level circuit; each bridge arm includes an upper arm and a lower arm coupled at a middle node; the upper arm includes a plurality of upper arm switches and the lower arm includes a plurality of lower arm switches; wherein each bridge arm includes a plurality of capacitors, and each of which is coupled between every two upper arm switches and every two lower arm switches. The phase-shifted pulse width modulation signal generation circuit generates a plurality of switch control signals to respectively control the plurality of upper arm switches and the plurality of lower arm switches. A phase angle difference between a plurality of first upper arm switch control signals of a first upper arm of a first bridge arm of a plurality of bridge arms is $\theta 3$, and a phase angle difference between one of a plurality of first lower arm switch control signals of a first lower arm of the first bridge arm and corresponding one of the plurality of first upper arm switch controls is respectively 180 degrees. A phase angle difference between one of the plurality of first upper arm switch control signals and corresponding one of the plurality of second upper arm switch control signals of a second upper arm of a second bridge arm of the plurality of bridge arms is $\theta 1$, and a phase angle difference between one of a plurality of second lower arm switch control signals of a second lower arm of the second bridge arm and corresponding one of the plurality of second upper arm switch control signals is respectively 180 degrees. The $\theta 1$ is one of $$\Delta phase = x \times \left(\frac{360°}{m \times (L-1)}\right),$$

where m is the number of the plurality of bridge arms, L is the number of levels of the flying capacitor multi-level circuit, and $x=1, 2, \ldots m \times (L-1)-1$.

The present disclosure also provides an operating method of an interleaved flying capacitor multi-level converter for supplying power to a load according to a power source. The operating method includes steps of: configuring the phase-shifted pulse width modulation signal generation circuit to generate n first upper arm switch control signals for controlling the n first upper arm switches and n first lower arm switch control signals for controlling the n first lower arm switches, and a phase angle difference between each first upper arm switch control signal and the corresponding first lower arm switch control signal is 180 degrees; configuring the phase-shifted pulse width modulation signal generation circuit to generate n second upper arm switch control signals for controlling the n second upper arm switches and n second lower arm switch control signals for controlling the n second lower arm switches, and a phase angle difference between each second upper arm switch control signal and the corresponding second lower arm switch control signal is 180 degrees.

Accordingly, the interleaved flying capacitor multi-level converter is provided to use phase-shifted PWM control signals with a specific phase angle for controlling a plurality of bridge arm switches so that the peaks and valleys of input currents of all or part of the bridge arms are interleaved to achieve the ripple suppression effect of the total input current.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
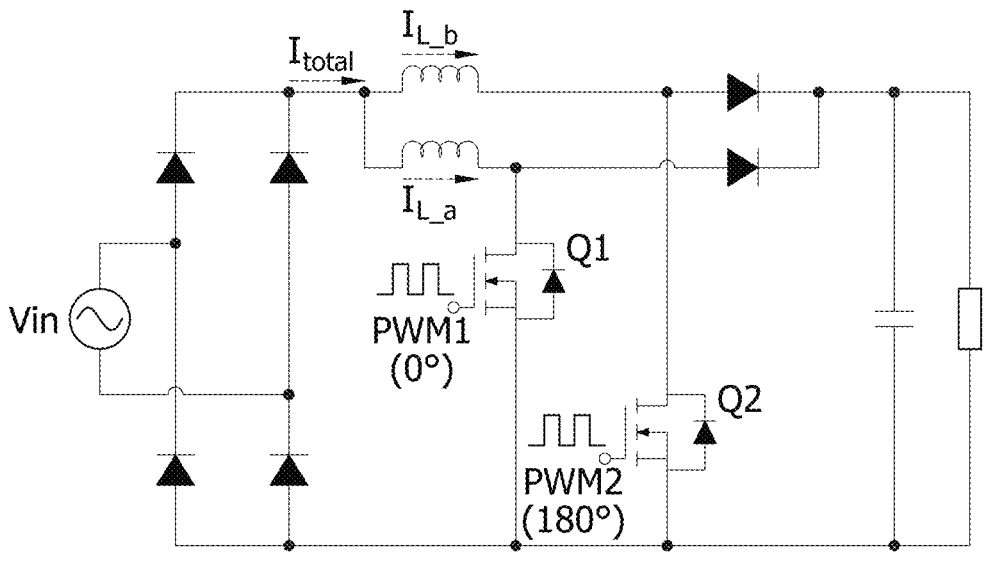
FIG. 1 is a circuit diagram of an interleaved boost power factor correction (PFC) circuit.
Figure 2:
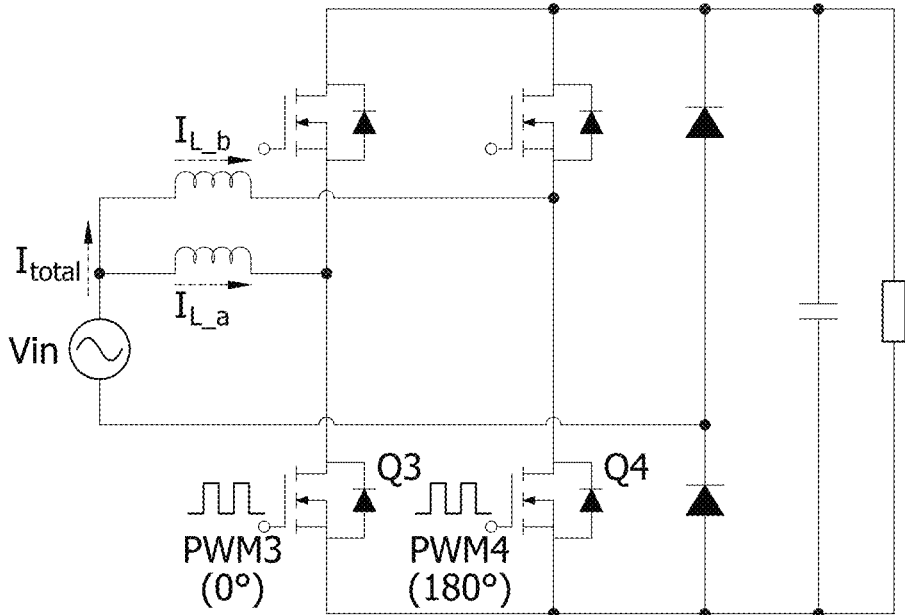
FIG. 2 is a circuit diagram of an interleaved Totem-Pole PFC circuit.
Figure 3:
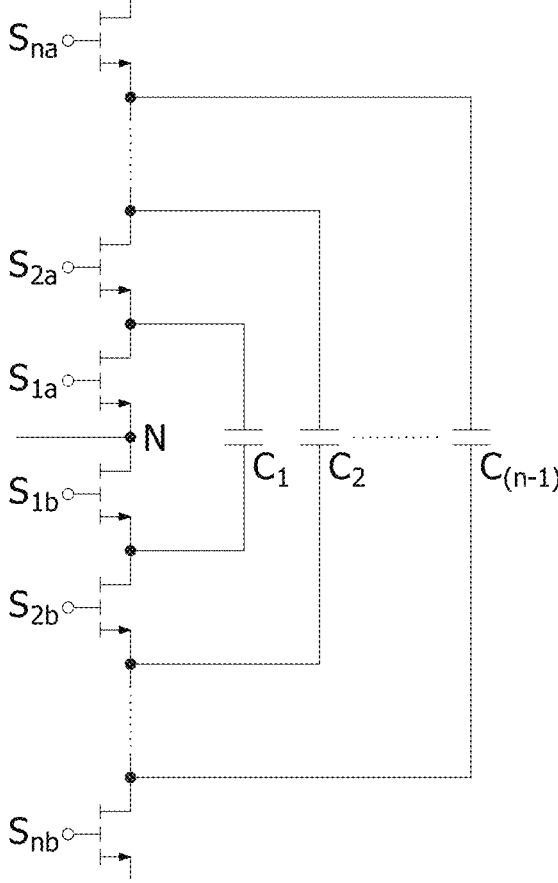
FIG. 3 is a schematic circuit diagram of a related-art flying capacitor multi-level circuit.

Reference will now be made to the drawing figures to describe the present disclosure in detail. It will be understood that the drawing figures and exemplified embodiments of present disclosure are not limited to the details thereof.

The following description demonstrates several embodiments of the interleaved flying capacitor multi-level converter and the operating method thereof for supplying power to a load according to a power source. Please refer to FIG. 6, which shows a circuit diagram of an interleaved flying capacitor multi-level converter 600 according to the present disclosure. The interleaved flying capacitor multi-level converter 600 is used to supply power to a load Load according to an alternating current (AC) input power source Vin. In this embodiment, the interleaved flying capacitor multi-level converter 600 can provide a power factor correction (PFC) function by a PFC control technology so as to adjust the input current to increase the power factor. Although the interleaved flying capacitor multi-level converter 600 shown in FIG. 6 is illustrated with a Totem-Pole circuit structure as an embodiment, the present disclosure may also be used with an appropriate circuit structure, such as a boost circuit (for example, an interleaved flying capacitor multi-level converter 700 shown in FIG. 7) to provide functions such as a circuit conversion or a power faction correction.

Figure 6:
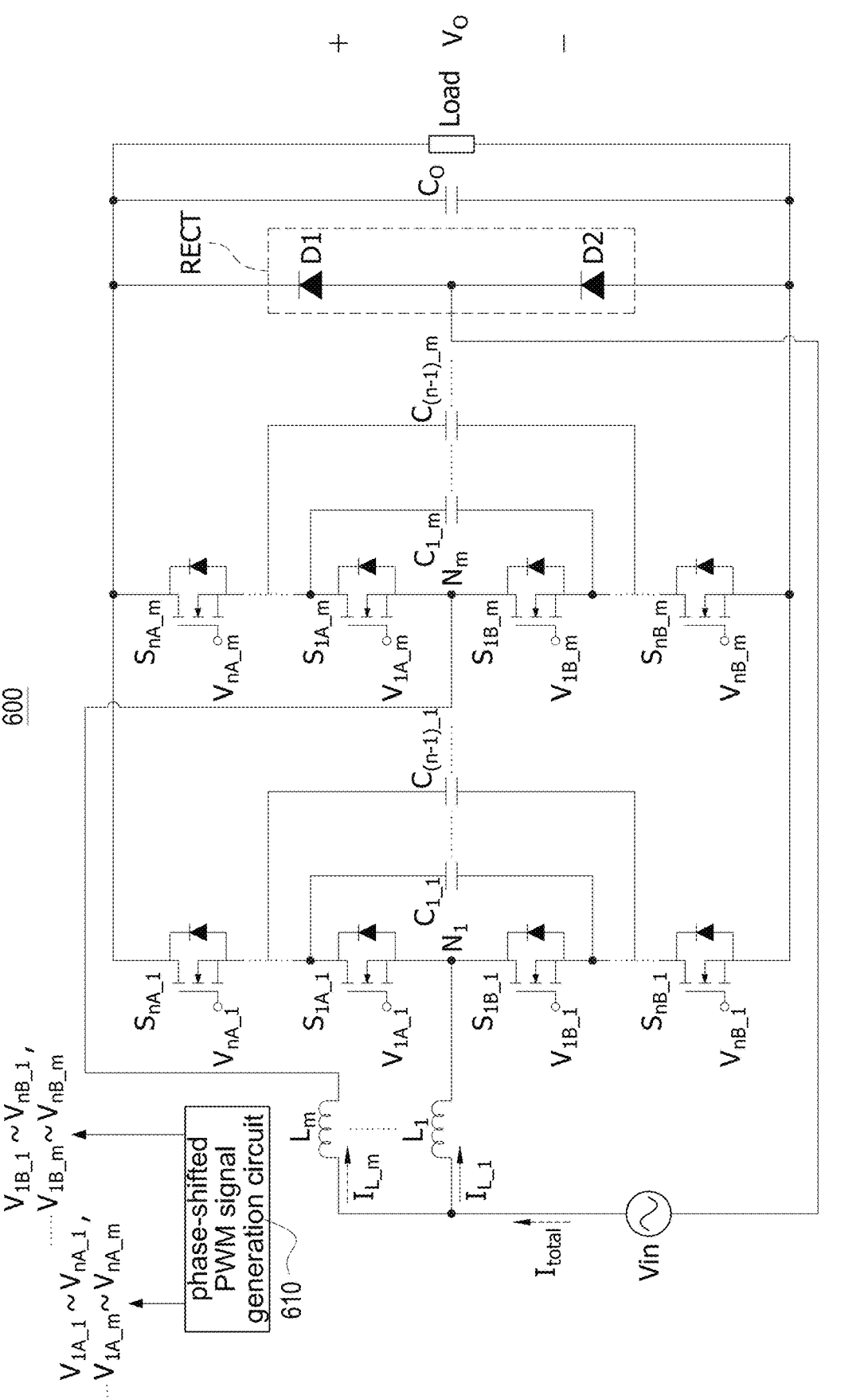
FIG. 6 is a circuit diagram of an interleaved flying capacitor multi-level converter according to an embodiment of the present disclosure.
Figure 7:
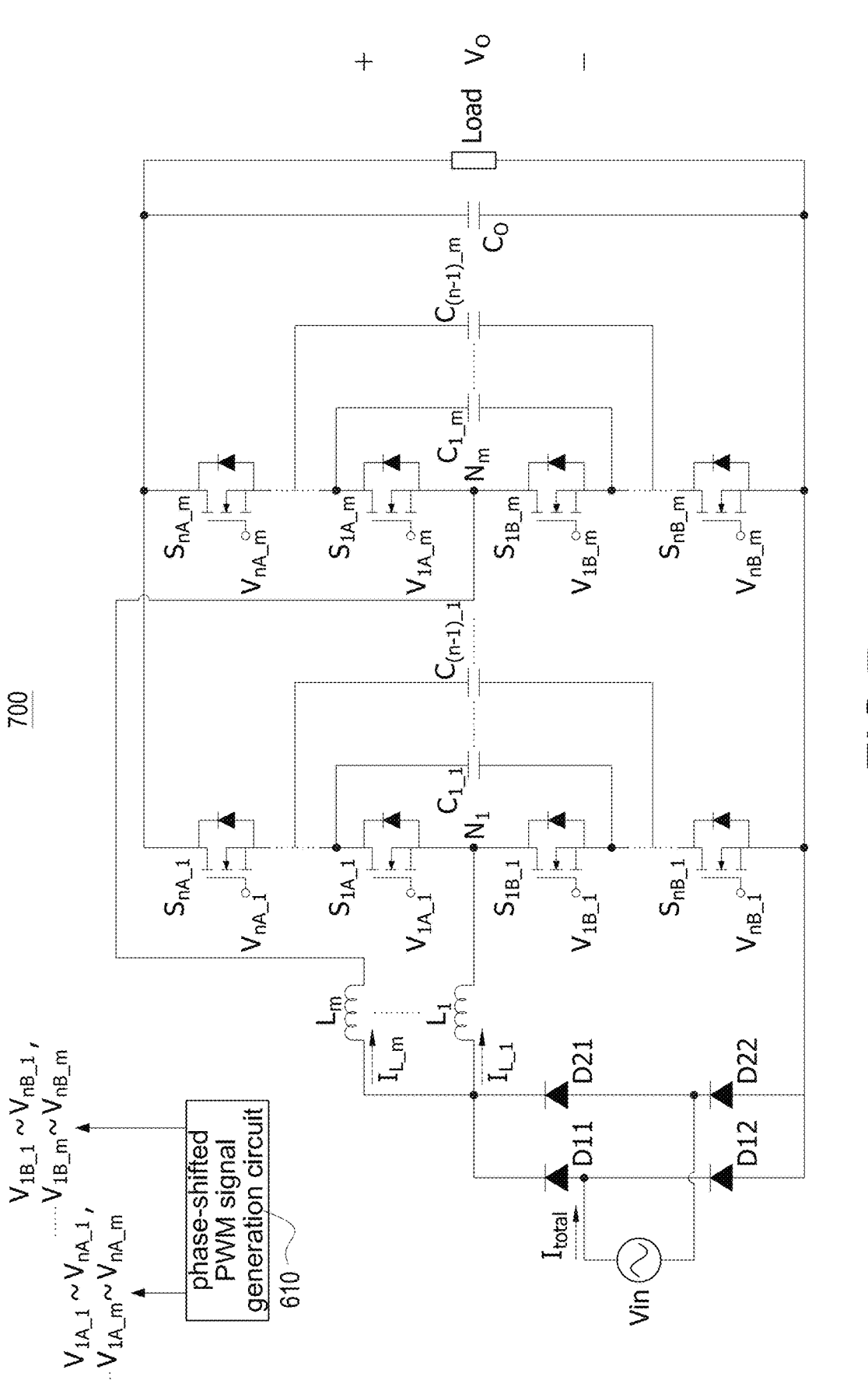
FIG. 7 is a circuit diagram of the interleaved flying capacitor multi-level converter according to another embodiment of the present disclosure.

As shown in the embodiment of FIG. 6, the interleaved flying capacitor multi-level converter 600 includes m bridge arms, where m is a positive integer greater than 2. Each bridge arm 1-$m$ includes an upper arm and a lower arm, and the bridge arms 1-$m$ are respectively coupled to middle nodes $N_1$-$N_m$. Taking the bridge arm 1 as an example, its upper arm includes n upper arm switches $S_{1A\_1}$-$S_{nA\_1}$ (where n is a positive integer greater than 1) and its lower arm includes n lower arm switches $S_{1B\_1}$-$S_{nB\_1}$. Similarly, taking the bridge arm m as an example, its upper arm includes n upper arm switches $S_{1A\_m}$-$S_{nA\_m}$ and its lower arm includes n lower arm switches $S_{1B\_m}$-$S_{nB\_m}$.

Moreover, the lower arm switches $S_{1B\_1}$-$S_{nB\_1}$, . . . $S_{1B\_m}$-$S_{nB\_m}$ are symmetrical to the upper arm switches $S_{1A\_1}$-$S_{nA\_1}$, . . . $S_{1A\_m}$-$S_{nA\_m}$ with middle nodes $N_1$-$N_m$, and the lower arm switches $S_{1B\_1}$-$S_{nB\_1}$, . . . $S_{1B\_m}$-$S_{nB\_m}$ and the upper arm switches $S_{1A\_1}$-$S_{nA\_1}$, . . . $S_{1A\_m}$-$S_{nA\_m}$ form a plurality of switch pairs. Taking bridge arm 1 as an example, the upper arm switch $S_{1A\_1}$ and the lower arm switch $S_{1B\_1}$ form a switch pair, and the upper arm switch $S_{nA\_1}$ and the lower arm switch $S_{nB\_1}$ form a switch pair. Similarly, the remaining upper arm switches and the symmetrical lower arm switches also form switch pairs. Taking bridge arm m as an example, the upper arm switch $S_{1A\_m}$ and the lower arm switch $S_{1B\_m}$ form a switch pair, and the upper arm switch $S_{nA\_m}$ and the lower arm switch $S_{nB\_m}$ form a switch pair. Similarly, the remaining upper arm switches and the symmetrical lower arm switches also form switch pairs.

Moreover, each bridge arm 1 . . . m further includes a plurality of capacitors $C_{1\_1}$-$C_{(n-1)\_1}$, . . . $C_{1\_m}$-$C_{(n-1)\_m}$. Two terminals of each capacitor are respectively coupled to two terminals of the corresponding switch pair, that is, one capacitor $C_{1\_1}$-$C_{(n-1)\_1}$, . . . $C_{1\_m}$-$C_{(n-1)\_m}$ is coupled between every two upper arm switches $S_{1A\_1}$-$S_{nA\_1}$, . . . $S_{1A\_m}$-$S_{nA\_m}$ and every two lower arm switches $S_{1B\_1}$-$S_{nB\_1}$, . . . $S_{1B\_m}$-$S_{nB\_m}$. Taking bridge arm 1 as an example, a first terminal of the capacitor $C_{1\_1}$ is coupled to a common-connected node between the upper arm switch $S_{1A\_1}$ and the upper arm switch $S_{2A\_1}$ (not shown in FIG. 6), and a second terminal of the capacitor $C_{1\_1}$ is coupled to a common-connected node between the lower arm switch $S_{1B\_1}$ and the lower arm $S_{2B\_1}$ (not shown in FIG. 6). A first terminal of the capacitor $C_{(n-1)\_1}$ is coupled to a common-connected node between the upper arm switch $S_{nA\_1}$ and the upper arm switch $S_{(n-1)A\_1}$ (not shown in FIG. 6), and a second terminal of the capacitor $C_{(n-1)\_1}$ is coupled to a common-connected node between the lower arm switch $S_{nB\_1}$ and the lower arm $S_{(n-1)B\_1}$ (not shown in FIG. 6). Similarly, one capacitor is coupled between every two remaining upper arm switches and every two remaining lower arm switches.

Therefore, each bridge arm 1 . . . m of the interleaved flying capacitor multi-level converter 600 is a flying capacitor multi-level circuit. The upper arm and the lower arm of each bridge arm 1 . . . m respectively include n switches, and (n−1) capacitors are coupled between the upper arm and the lower arm, where a level (L) of the converter: L=n+1.

In one embodiment, the interleaved flying capacitor multi-level converter 600 includes a plurality of inductors $L_1$ . . . $L_m$. A first terminal of each inductor $L_1$ . . . $L_m$ is coupled to a first terminal of the input power source Vin, and a second terminal of each inductor $L_1$ . . . $L_m$ is correspondingly coupled to a middle node $N_1$ . . . $N_m$ of each bridge arm 1 . . . m. Input currents of the inductors $L_1$ . . . $L_m$ are $I_{L\_1}$ . . . $I_{L\_m}$, and the sum of $I_{L\_1}$ . . . $I_{L\_m}$ is a total input current $I_{total}$. The input power source Vin and each bridge arm 1 . . . m are coupled to a rectification circuit RECT, an output capacitor Co, and the load Load to provide an output voltage Vo for supplying power to the load Load. In one embodiment, the rectification circuit RECT includes two diodes D1, D2. The first terminal of each bridge arm 1 . . . m is coupled to a first terminal of the diode D1, a second terminal of the diode D1 is coupled to a first terminal of the diode D2, the second terminal of each bridge arm 1 . . . m is coupled to a second terminal of the diode D2, and a second terminal of the input power source Vin is coupled to the second terminal of the diode D1 and the first terminal of the diode D2.

In addition, the interleaved flying capacitor multi-level converter 600 includes a phase-shifted pulse width modulation (PWM) signal generation circuit 610. The phase-shifted PWM signal generation circuit 610 may be implemented by, for example, but not limited to, a digital circuit, an analog circuit, a signal processor, or a microcontroller to generate a plurality of upper arm switch control signals $V_{1A\_1}$-$V_{nA\_1}$, . . . $V_{1A\_m}$-$V_{nA\_m}$ and a plurality of lower arm switch control signals $V_{1B\_1}$-$V_{nB\_1}$, . . . $V_{1B\_m}$-$V_{nB\_m}$ for respectively controlling the upper arm switches $S_{1A\_1}$-$S_{nA\_1}$, . . . $S_{1A\_m}$-$S_{nA\_m}$ and the lower arm switches $S_{1B\_1}$-$S_{nB\_1}$, . . . $S_{1B\_m}$-$S_{nB\_m}$ of the bridge arms. These switch control signals are implemented by using a phase-shifted pulse width modulation (PWM). Taking the bridge arm 1 as an example, the upper arm switch control signals $V_{1A\_1}$-$V_{nA\_1}$ are phase-shifted PWM signals, and the lower arm switch control signals $V_{1B\_1}$-$V_{nB\_1}$ are PWM signals with a phase shift of 180 degrees of the upper arm switch control signals $V_{1A\_1}$-$V_{nA\_1}$ respectively. Moreover, the corresponding switch control signals of each bridge arm 2 . . . m (or part of the bridge arm) may also be set as phase-shifted PWM signals relative to the corresponding switch control signals of the bridge arm 1 to achieve an interleaved control implementation.

In one embodiment, the phase-shifted PWM signal generation circuit 610 generates the upper arm switch control signals $V_{1A\_1}$-$V_{nA\_1}$ of the bridge arm 1, which are substantially the same PWM signals respectively, however, the adjacent switch control signals respectively have a phase angle difference of a third phase angle θ3, in particular, the third phase angle θ3: θ3=(360°)/(L−1), where L is the number of levels of the flying capacitor multi-level converter. According to the above-mentioned formula of the number of levels: L=(n+1), where n is the number of switches of the upper arm or the number of switches of the lower arm, the third phase angle θ3 may also be set to θ3=(360°)/n. For example, the upper arm switch control signals $V_{2A\_1}$, $V_{2A\_1}$ . . . $V_{nA\_1}$ and the upper arm switch control signal $V_{1A\_1}$, which is a PWM signal have respectively 1 . . . (n−1)×Θ3 phase angle differences. The control signal $V_{1A\_1}$ for controlling the switch $S_{1A\_1}$ of the bridge arm 1 is a PWM signal with a 10% duty cycle. The control signal $V_{2A\_1}$ for controlling the switch $S_{2A\_1}$ of the bridge arm 1 is a PWM signal that is phase-shifted by the third phase angle θ3 to the control signal $V_{1A\_1}$, i.e., $V_{2A\_1}=V_{1A\_1}\times e^{j\theta3}$. The control signal $V_{nA\_1}$ for controlling the switch $S_{nA\_1}$ of the bridge arm 1 is a PWM signal that is phase-shifted by (n−1)×θ3 to the control signal $V_{1A\_1}$, i.e., $V_{nA\_1}=V_{1A\_1}\times e^{j(n-1)\theta3}$. The lower arm switch control signals $V_{1B\_1}$-$V_{nB\_1}$, . . . $V_{1B\_m}$-$V_{nB\_m}$ are PWM signals that are phase-shifted by 180 degrees to the corresponding upper arm switch control signals $V_{1A\_1}$-$V_{nA\_1}$, . . . $V_{1A\_m}$-$V_{nA\_m}$. For example, $V_{1B\_1}=V_{1A\_1}\times e^{j\pi}$, $V_{2B\_1}=V_{2A\_1}\times e^{j\pi}=V_{1A\_1}\times e^{j(\pi+\theta3)}$ . . . , and $V_{nB\_1}=V_{nA\_1}\times e^{j\pi}=V_{1A\_1}\times e^{j(\pi+(n-1)\theta3)}$.

In addition, the phase-shifted PWM signal generation circuit 610 may be configured to generate switch control signals of the bridge arms 2, 3, . . . m, which respectively have a phase angle difference of 1, 2, . . . (m−1)×θ1 between the corresponding switch control signals of the bridge arm 1. For example, $V_{1A\_m}=V_{1A\_1}\times e^{j(m-1)\theta1}$, $V_{2A\_m}=V_{2A\_1}\times e^{j(m-1)\theta1}$ . . . , $V_{nA\_m}=V_{nA\_1}\times e^{j(m-1)\theta1}$, and $V_{1B\_m}=V_{1B\_m}=V_{1B\_1}\times e^{j(m-1)\theta1}$, $V_{2B\_m}=V_{2B\_1}\times e^{j(m-1)\theta1}$ . . . , $V_{nB\_m}=V_{nB\_1}\times e^{j(m-1)\theta1}$. The first phase angle θ1 may be selected from one of the Δphase by the following formula:

$$\Delta phase = x \times \left(\frac{360°}{m \times (L-1)}\right),$$

8 where m is the number of the bridge arms, L is the number of levels of the flying capacitor multi-level circuit, and x=1, 2, . . . m×(L−1)−1. It is assumed that the number of the bridge arms of the interleaved flying capacitor multi-level converter 600 is 2 (i.e., m=2) and the number of levels of each bridge arm of the flying capacitor multi-level circuit is 4 (i.e., L=4), and therefore according to the above-mentioned formula, the first phase angle θ1 can be calculated and selected from one of 60 degrees, 120 degrees, 180 degrees, 240 degrees, and 300 degrees. For example, if the first phase angle θ1 is 60 degrees, the corresponding switch control signals of the bridge arm 2 are lagged (or led in another embodiment) by 60 degrees to the switch control signals of the bridge arm 1. If the first phase angle θ1 is 120 degrees, the corresponding switch control signals of the bridge arm 2 are lagged (or led in another embodiment) by 120 degrees to the switch control signals of the bridge arm 1, and so on.

In another embodiment, the interleaved control of the present disclosure may be further adjusted to reduce the ripple of the total input current $I_{total}$. Therefore, after the selectable phase angles Δphase are calculated, at least one second phase angle ΔphaseX may be excluded, that is, the used first phase angle θ1 does not includes the at least one second phase angle ΔphaseX. In particular, the second phase angle ΔphaseX:

$$\Delta phaseX = y \times \left(\frac{360°}{L-1}\right),$$

where L is the number of levels of the flying capacitor multi-level converter, y=1 . . . (L−2). It is assumed that the number of levels of the flying capacitor multi-level converter of each bridge arm of the interleaved flying capacitor multi-level converter 600 is four (i.e., L=4), the second phase angle ΔphaseX is 120 degrees and 240 degrees. When the selectable phase angles Δphase are calculated to be 60 degrees, 120 degrees, 180 degrees, 240 degrees, and 300 degrees, and further the second phase angle ΔphaseX of 120 degrees and 240 degrees may be excluded, the used first phase angle θ1 may be one of 60 degrees, 180 degrees, and 300 degrees so as to reduce the ripple of the total input current $I_{total}$ of the interleaved flying capacitor multi-level converter 600.

According to the above-disclosed formula, Table 1 lists angle values of selectable phase angle Δphase and the second phase angle ΔphaseX under conditions of different numbers (m) of the bridge arms and different numbers (L) of the levels of the flying capacitor multi-level converter.

TABLE 1

| L | m | selectable phase angle Δphase (degree) | second phase angle ΔphaseX (degree) |
|---|---|---|---|
| 3 | 2 | 90, 180, 270 | 180 |
| 4 | 2 | 60, 120, 180, 240, 300 | 120, 240 |
| 5 | 2 | 45, 90, 135, 180, 225, 270, 315 | 90, 180, 270 |
| 3 | 3 | 60, 120, 180, 240, 300 | 180 |
| 4 | 3 | 40, 80, 120, 160, 200, 240, 280, 320 | 120, 240 |
| 5 | 3 | 30, 60, 90, 120, 150, 180, 210, 240, 270, 300, 330 | 90, 180, 270 |

Figure 8:
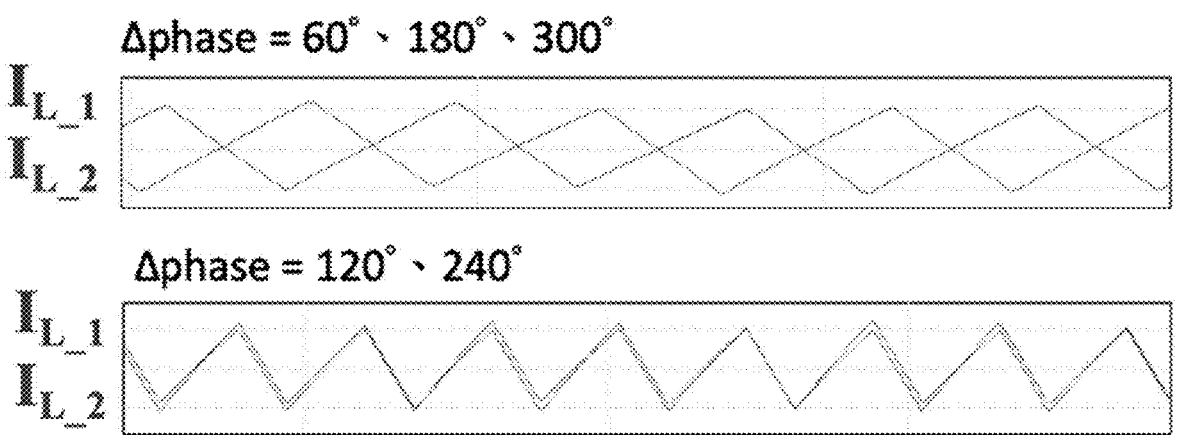
FIG. 8 is a schematic diagram of an input current waveform of the interleaved flying capacitor multi-level converter with a two-arm and four-level flying capacitor structure according to the present disclosure.

The following description will illustrate the achieved ripple reduction effect of the interleaved flying capacitor multi-level converter 600 of the present disclosure according to the current waveform diagrams shown in FIG. 8 to FIG.

10. As shown in FIG. 8, which shows a schematic diagram of an input current waveform of the interleaved flying capacitor multi-level converter 600 with a two-arm and four-level flying capacitor structure. It can be obviously seen in the upper half of FIG. 8 that when the first phase angle θ1 is one of the selectable phase angles Δphase, i.e., one of 60 degrees, 180 degrees, and 300 degrees, the interleaved peaks and valleys of the two input currents $I_{L\_1}$, $I_{L\_2}$ of two bridge arms can be achieved. For example, the input currents $I_{L\_1}$, $I_{L\_2}$ in FIG. 8 are sawtooth waves, and when the input current $I_{L\_1}$ is the maximum value (i.e., the peak value), the input current $I_{L\_2}$ is close to the minimum value (i.e., the valley value); one the contrary, when the input current $I_{L\_2}$ is the maximum value, the input current $I_{L\_1}$ is close to the minimum value. Therefore, the peaks and valleys of the input current $I_{L\_1}$ and the input current $I_{L\_2}$ are interleaved so that the summed total input current $I_{total}$ achieves the optimal ripple suppression effect (see the total input current $I_{total}$ shown in FIG. 10). However, it can be obviously seen in the lower half of FIG. 8 that when the first phase angle θ1 is one of the second phase angles ΔphaseX, i.e., 120 degrees or 240 degrees, since the peaks and valleys of the two input currents $I_{L\_1}$, $I_{L\_2}$ are not significantly interleaved, the ripple suppression effect of the total input current $I_{total}$ is poor.

Figure 9:
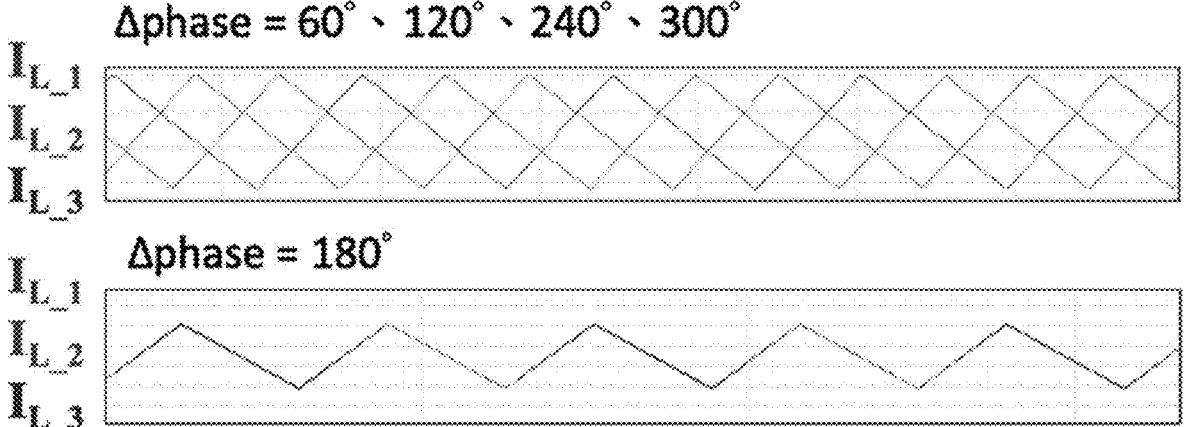
FIG. 9 is a schematic diagram of an input current waveform of the interleaved flying capacitor multi-level converter with a three-arm and three-level flying capacitor structure according to the present disclosure.

Similarly, as shown in FIG. 9, which shows a schematic diagram of an input current waveform of the interleaved flying capacitor multi-level converter 600 with a three-arm and three-level flying capacitor structure. It can be obviously seen in the upper half of FIG. 9 that when the first phase angle θ1 is one of the selectable phase angles Δphase, i.e., one of 60 degrees, 120 degrees, 240 degrees, and 300 degrees, the interleaved peaks and valleys of the three input currents $I_{L\_1}$, $I_{L\_2}$, $I_{L\_3}$ of three bridge arms can be achieved. However, it can be obviously seen in the lower half of FIG. 9 that when the first phase angle θ1 is the second phase angles ΔphaseX, i.e., 180 degrees, since the peaks and valleys of the three input currents $I_{L\_1}$, $I_{L\_2}$, $I_{L\_3}$ are not significantly interleaved, the ripple suppression effect of the total input current $I_{total}$ is poor.

Figure 10:
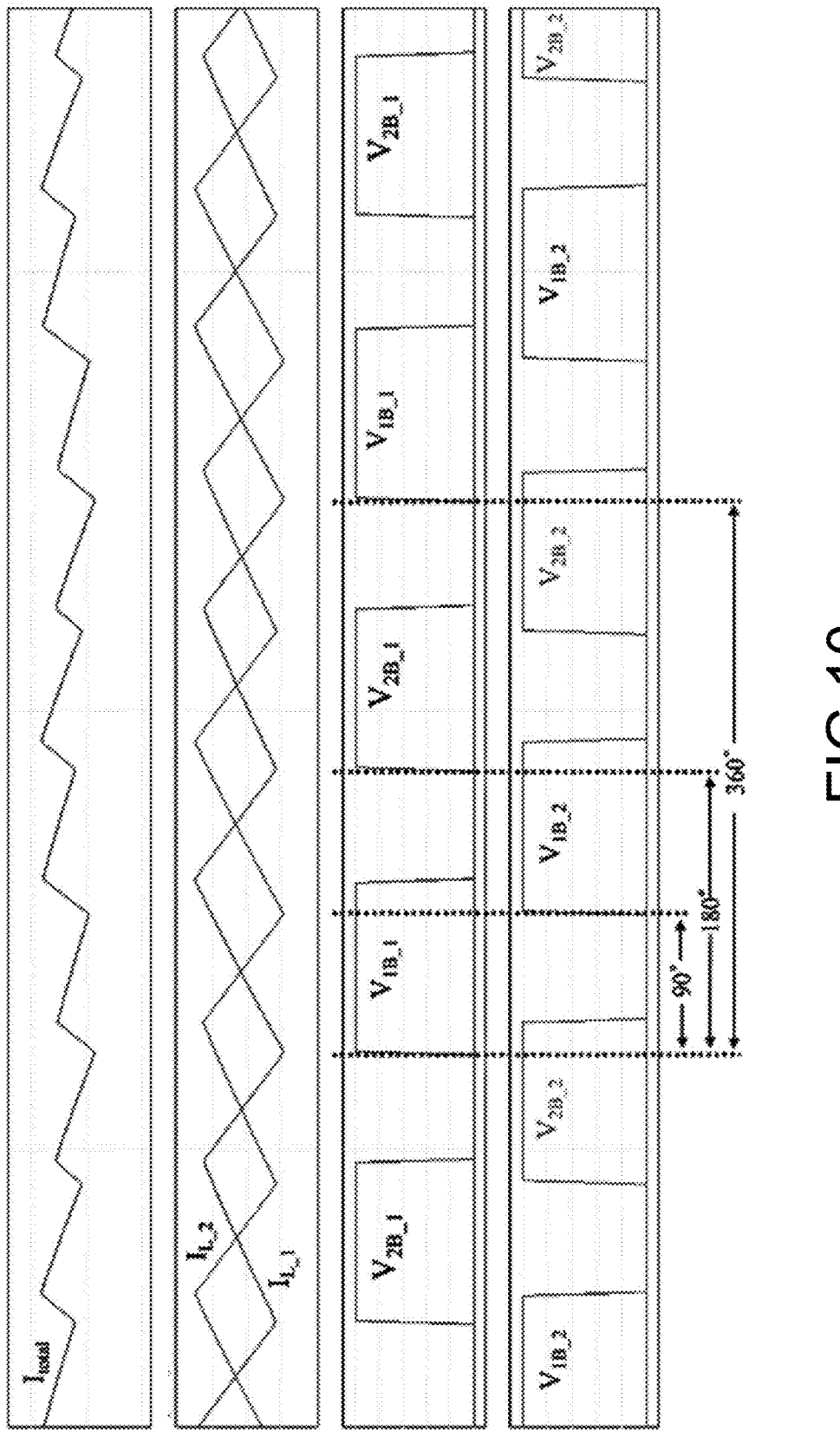
FIG. 10 to FIG. 12 are schematic diagrams of input current waveforms and control signal waveforms of the interleaved flying capacitor multi-level converter with a two-arm and three-level flying capacitor structure.
Figure 11:
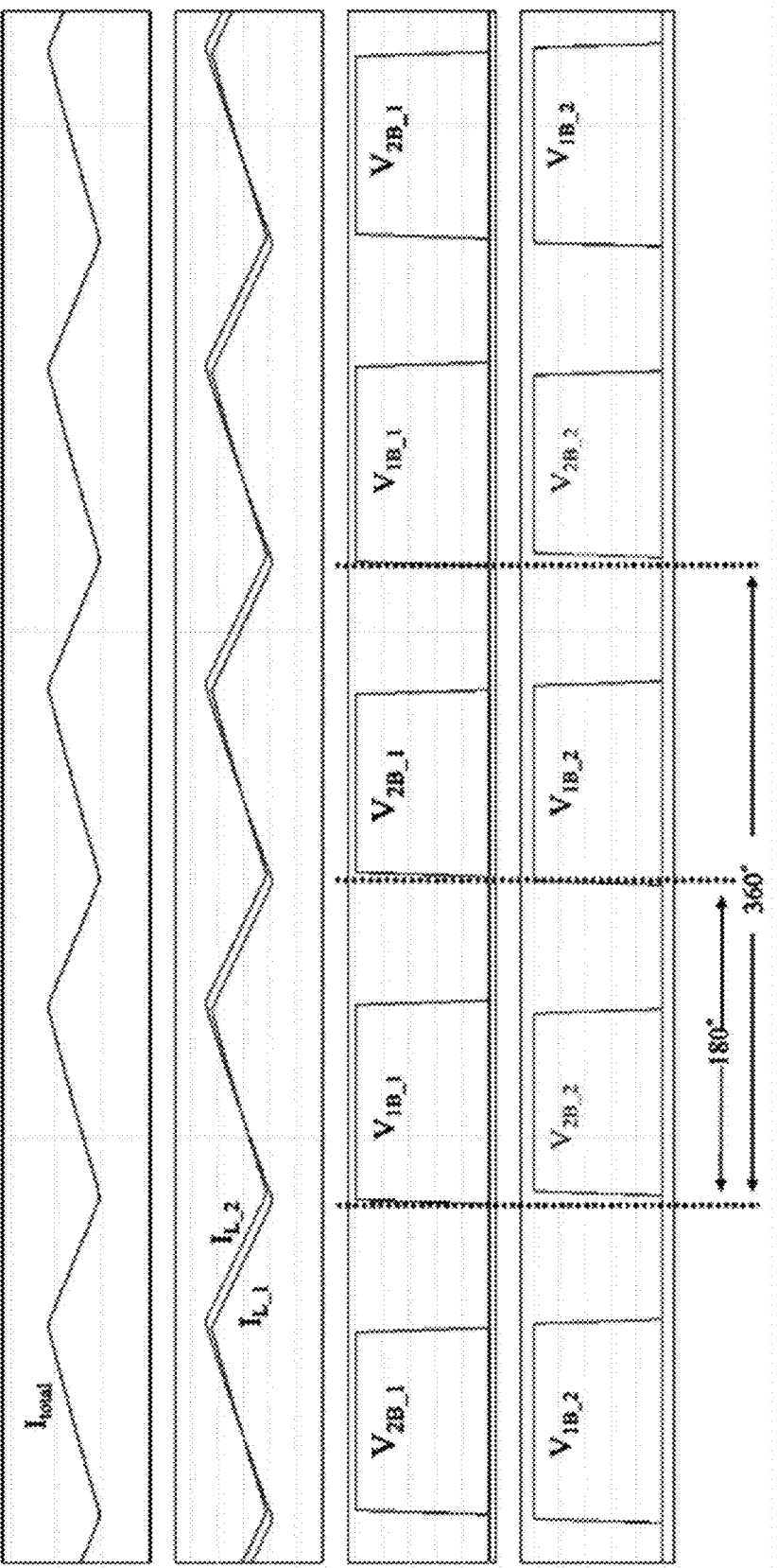
Figure 12:
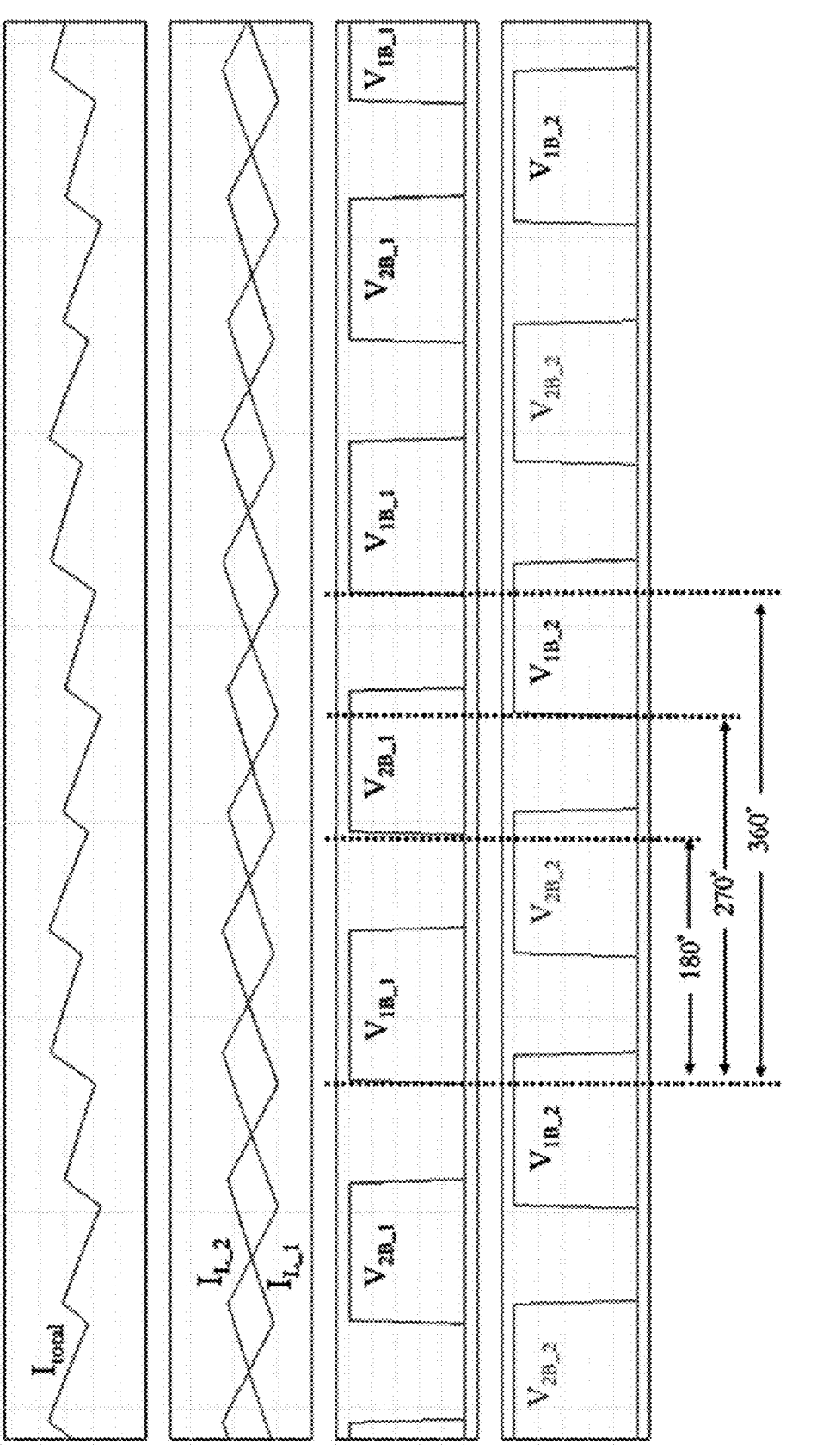

In addition, please refer to FIG. 10 to FIG. 12, which show schematic diagrams of the input current waveforms and control signal waveforms of the interleaved flying capacitor multi-level converter 600 using different first phase angles θ1 under the interleaved flying capacitor multi-level converter 600 with a two-arm and three-level flying capacitor structure. In particular, the first phase angle θ1 shown in FIG. 10 is 90 degrees, the first phase angle θ1 shown in FIG. 11 is 180 degrees, and the first phase angle θ1 shown in FIG. 12 is 270 degrees. As mentioned above and in Table 1, under the under the two-arm (m=2) and three-level (L=3) flying capacitor structure, since one of the 90 degrees, 180 degrees, and 270 degrees may be selected as the first phase angle θ1, and further the second phase angle ΔphaseX of 180 degrees may be excluded, the used first phase angle θ1 of the preferred solution may be one of the selectable phase angles Δphase, i.e., one of 90 degrees and 270 degrees. In other words, when the first phase angle θ1 shown in FIG. 10 is 90 degrees or the first phase angle θ1 shown in FIG. 12 is 270 degrees, the peaks and valleys of the two input currents $I_{L\_1}$, $I_{L\_2}$ can achieve an interleaved effect. Therefore, for FIG. 10 and FIG. 12, when a peak-to-peak value of the input currents $I_{L\_1}$, $I_{L\_2}$ is 7 amps, the ripple of the total input current $I_{total}$ may be suppressed to approximately 2 amps (peak-to-peak value). In FIG. 11, however, the first phase angle θ1 is 180 degrees and the peaks and valleys of the two input currents $I_{L\_1}$, $I_{L\_2}$ cannot achieve an obvious interleaved effect. When a peak-to-peak value of the input currents $I_{L\_1}$, $I_{L\_2}$ is 7 amps, the ripple of the total input current $I_{total}$ may be approximately 14 amps. Obviously, the ripple suppression effect of the total input current $I_{total}$ in FIG. 11 is worse than that when the used first phase angle θ1 is 90 degrees as shown in FIG. 10) or that when the used first phase angle θ1 is 270 degrees as shown in FIG. 12.

Figure 4:
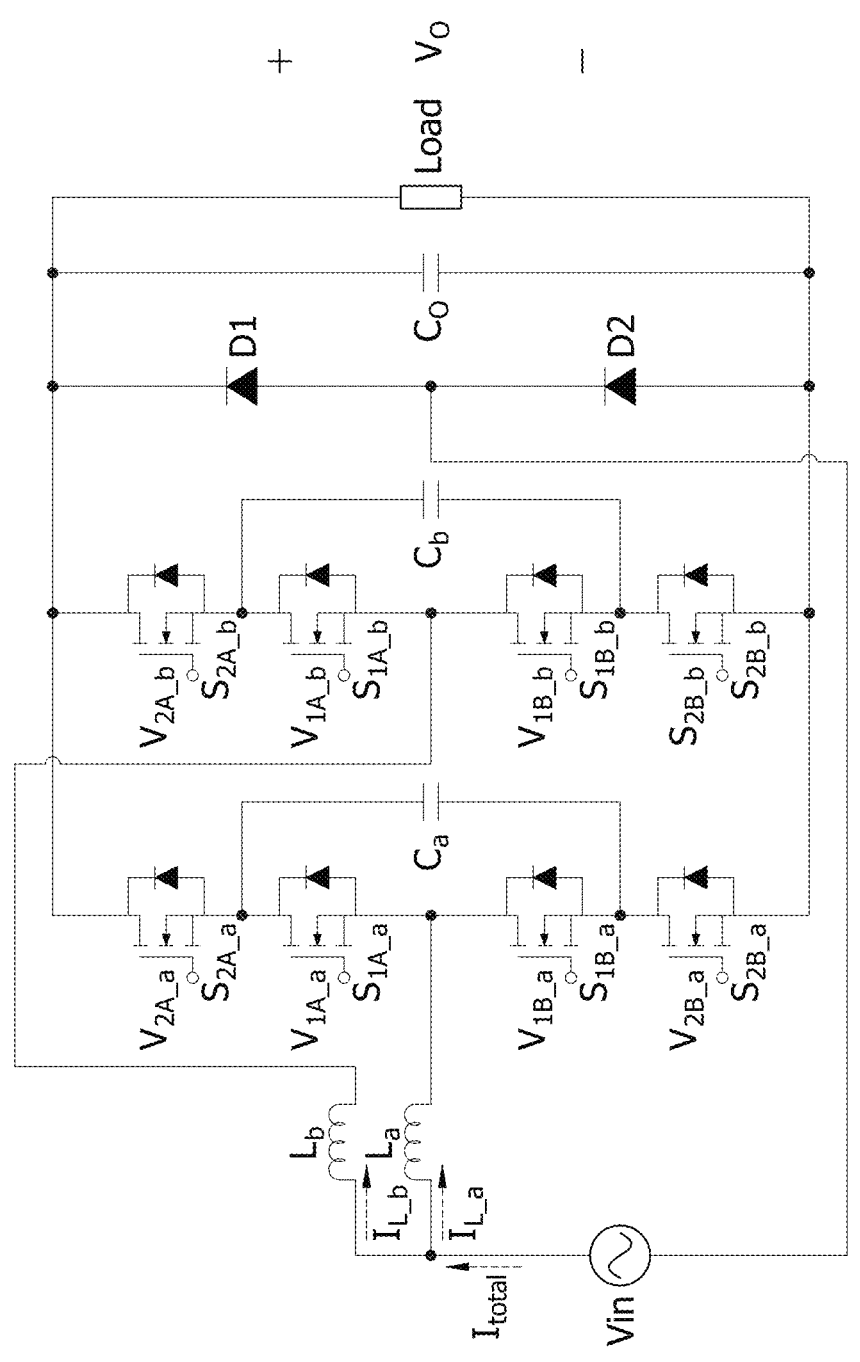
FIG. 4 is a circuit diagram of a related-art interleaved flying capacitor multi-level Totem-Pole power factor corrector.
Figure 5:
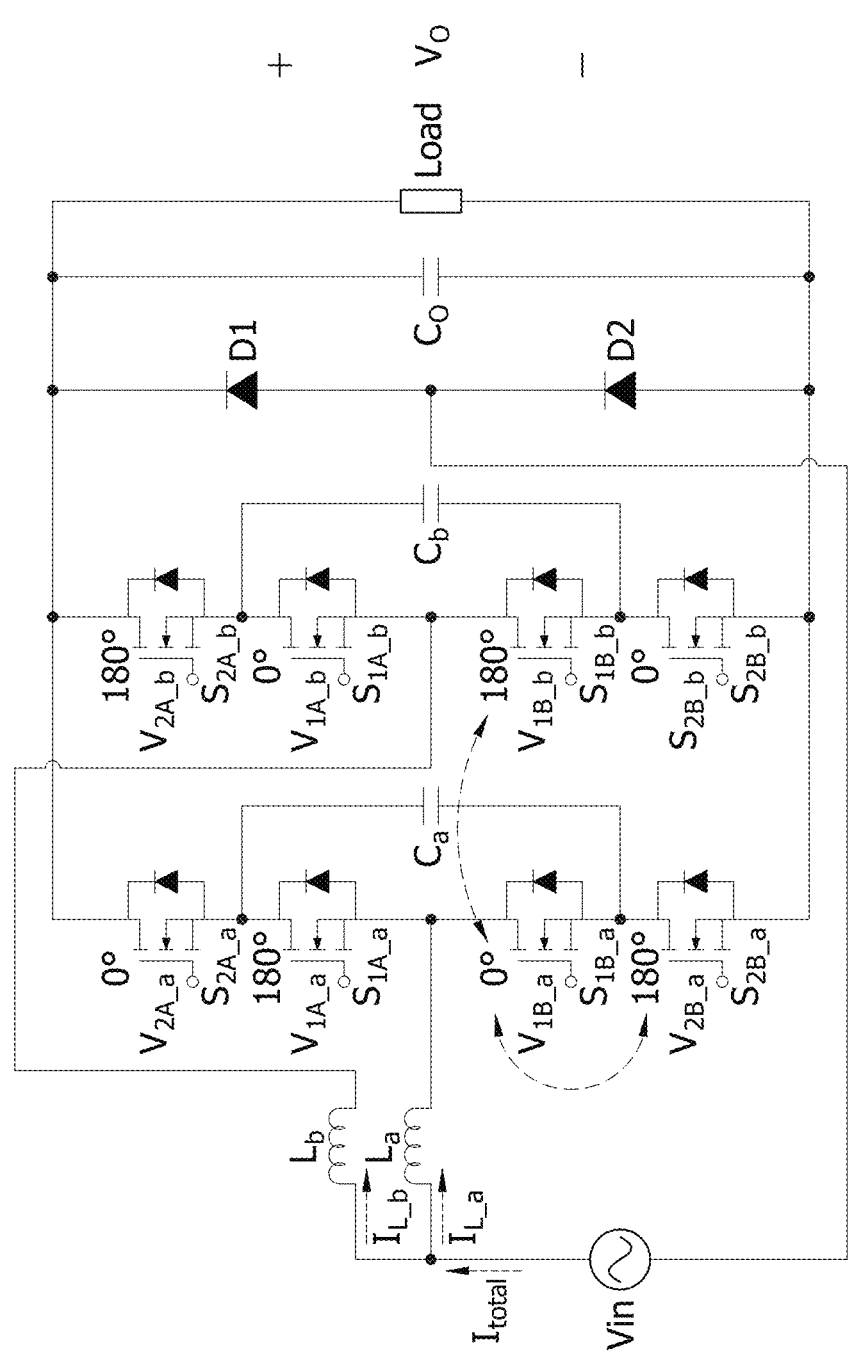
FIG. 5 is a circuit diagram of a related-art interleaved flying capacitor multi-level Totem-Pole power factor corrector showing phase angle differences of switch control signals.

Please refer to FIG. 10 and FIG. 4. As shown in FIG. 10, the control signal for controlling the lower arm switch $S_{1B\_1}$ of bridge arm 1 is $V_{1B\_1}$ and the control signal for controlling the lower arm switch $S_{2B\_1}$ of bridge arm 1 is $V_{2B\_1}$, and the phase angle difference between the two (i.e., $V_{1B\_1}$ and $V_{2B\_1}$) is the third phase angle θ3 of 180 degrees. Moreover, the control signal for controlling the lower arm switch $S_{1B\_2}$ of bridge arm 2 corresponding to the lower arm switch $S_{1B\_1}$ of bridge arm 1 is $V_{1B\_2}$, and the phase angle difference between the two (i.e., $V_{1B\_1}$ and $V_{1B\_2}$) is the first phase angle θ1 of 90 degrees. In the embodiment shown in FIG. 10, when the used first phase angle θ1 is 90 degrees, the peaks and valleys of the two input currents $I_{L\_1}$, $I_{L\_2}$ can be interleaved, thereby achieving a better ripple suppression effect of the total input current $I_{total}$.

Similarly, please refer to FIG. 12 and FIG. 4. As shown in FIG. 12, the control signal for controlling the lower arm switch $S_{1B\_1}$ of bridge arm 1 is $V_{1B\_1}$ and the control signal for controlling the lower arm switch $S_{2B\_1}$ of bridge arm 1 is $V_{2B\_1}$, and the phase angle difference between the two (i.e., $V_{1B\_1}$ and $V_{2B\_1}$) is the third phase angle θ3 of 180 degrees. Moreover, the control signal for controlling the lower arm switch $S_{1B\_2}$ of bridge arm 2 corresponding to the lower arm switch $S_{1B\_1}$ of bridge arm 1 is Vis 2, and the phase angle difference between the two (i.e., $V_{1B\_1}$ and $V_{1B\_2}$) is the first phase angle θ1 of 270 degrees. In the embodiment shown in FIG. 12, when the used first phase angle θ1 is 270 degrees, the peaks and valleys of the two input currents $I_{L\_1}$, $I_{L\_2}$ can be interleaved, thereby achieving a better ripple suppression effect of the total input current $I_{total}$.

However, please refer to FIG. 11 and FIG. 4. As shown in FIG. 11, the control signal for controlling the lower arm switch $S_{1B\_1}$ of bridge arm 1 is $V_{1B\_1}$ and the control signal for controlling the lower arm switch $S_{2B\_1}$ of bridge arm 1 is $V_{2B\_1}$, and the phase angle difference between the two (i.e., $V_{1B\_1}$ and $V_{2B\_1}$) is the third phase angle θ3 of 180 degrees. Moreover, the control signal for controlling the lower arm switch $S_{1B\_2}$ of bridge arm 2 corresponding to the lower arm switch $S_{1B\_1}$ of bridge arm 1 is Vis 2, and the phase angle difference between the two (i.e., $V_{1B\_1}$ and $V_{1B\_2}$) is the first phase angle θ1 of 180 degrees. In the embodiment shown in FIG. 11, when the used first phase angle θ1 is 180 degrees, the peaks and valleys of the two input currents $I_{L\_1}$, $I_{L\_2}$ cannot be obviously interleaved, thereby failing to achieve a better ripple suppression effect of the total input current $I_{total}$.

In other embodiments, the phase angle difference of the switch control signals between the bridge arms generated by the phase-shifted PWM signal generation circuit 610 may be set to the same first phase angle θ1 for phase lag. For example, each switch control signal of the bridge arm 2 lags by the first phase angle θ1 to each switch control signal of the corresponding bridge arm 1, each switch control signal of the bridge arm 3 lags by 2×Δphase to each switch control signal of the corresponding bridge arm 1, and each switch control signal of the bridge arm m lags by (m−1)×Δphase to each switch control signal of the corresponding bridge arm 1. Therefore, the peaks and valleys of the input currents $I_{L\_1} \ldots I_{L\_m}$ of each bridge arm can achieve an interleaved effect, thereby achieving a better ripple suppression effect of the total input current $I_{total}$.

In other embodiments, for different design considerations such as simplifying control, the phase-shifted PWM signal generation circuit 610 may be configured to generate the switch control signals of one part of bridge arms using the same first phase angle θ1, while the switch control signals of the other part of bridge arms may not use the same first phase angle θ1 for phase lag. For example, each switch control signal of the bridge arms 2 to g lags by the 1 to (g−1) first phase angle θ1 to each switch control signal of the corresponding bridge arm 1 however, each switch control signal of the bridge arms (g+1) to m does not lag by the g to (m−1)×Δphase to each switch control signal of the corresponding bridge arm 1, where g is a positive integer and 2<g<m. Since the peaks and valleys of the input currents $I_{L\_1} \ldots I_{L\_g}$ of the bridge arms 1 to g can obviously achieve an interleaved effect, even if the peaks and valleys of the input current $I_{L\_1} \ldots I_{L\_g}$ of the bridge arms (g+1) to m do not have an obvious interleaved effect, the summed total input current $I_{total}$ can still acquire an acceptable ripple suppression effect.

In other embodiments, the phase angle difference of the switch control signals between the bridge arms (or part of the bridge arms) generated by the phase-shifted PWM signal generation circuit 610 may be set to not be equal to the first phase angle θ1 for phase lag, and only an appropriate angle other than the second phase angle ΔphaseX is selected so that the peaks and valleys of the input currents $I_{L\_1} \ldots I_{L\_m}$ of all or part of the bridge arms can have an interleaved effect, and therefore the summed total input current $I_{total}$ can still acquire an acceptable ripple suppression effect.

In summary, the present disclosure has the following features and advantages: an interleaved flying capacitor multi-level converter is provided to use phase-shifted PWM control signals with a specific phase angle for controlling a plurality of bridge arm switches so that the peaks and valleys of input currents of all or part of the bridge arms are interleaved to achieve the ripple suppression effect of the total input current.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An interleaved flying capacitor multi-level converter, configured to supply power to a load according to a power source, comprising:

a first bridge arm comprising a first flying capacitor multi-level circuit, wherein the first flying capacitor multi-level circuit comprises a first middle node configured to couple to the power source, a first upper arm comprising n first upper arm switches, a first lower arm comprising n first lower arm switches, and (n−1) capacitors respectively coupled to the first upper arm and the first lower arm; wherein a first terminal of the first upper arm is configured to couple to the load, a second terminal of the first upper arm is coupled to the first middle node; a first terminal of the first lower arm is coupled to the first middle node, and a second terminal of the first lower arm is configured to couple to the load, a second bridge arm comprising a second flying capacitor multi-level circuit, wherein the second flying capacitor multi-level circuit comprises a second middle node configured to couple to the power source, a second upper arm comprising n second upper arm switches, a second lower arm comprising n second lower arm switches, and (n−1) capacitors respectively coupled to the second upper arm and the second lower arm; wherein a first terminal of the second upper arm is configured to couple to the load, and a second terminal of the second upper arm is coupled to the second middle node; a first terminal of the second lower arm is coupled to the second middle node, and a second terminal of the second lower arm is configured to couple to the load, and a phase-shifted pulse width modulation signal generation circuit configured to generate a plurality of switch control signals to respectively control the plurality of upper arm switches and the plurality of lower arm switches, where n is a positive integer greater than 1, wherein the phase-shifted pulse width modulation signal generation circuit is configured to generate n first upper arm switch control signals for controlling the n first upper arm switches and n first lower arm switch control signals for controlling the n first lower arm switches, and a phase angle difference between each first upper arm switch control signal and the corresponding first lower arm switch control signal is 180 degrees, wherein the phase-shifted pulse width modulation signal generation circuit is configured to generate n second upper arm switch control signals for controlling the n second upper arm switches and n second lower arm switch control signals for controlling the n second lower arm switches, and a phase angle difference between each second upper arm switch control signal and the corresponding second lower arm switch control signal is 180 degrees, wherein a phase angle difference between the h-th first upper arm switch and the 1st first upper arm switch is (h−1)×θ3, where h is a positive integer and 1<h<=n, $$\theta 3 = \frac{360°}{(L-1)},$$

L is the number of levels of the first flying capacitor multi-level circuit and L=n+1, wherein a phase angle difference between the i-th second upper arm switch and the i-th first upper arm switch is θ1, where i is a positive integer and 1≤i≤n, θ1 is not equal to $$\Delta phaseX = y \times \left(\frac{360°}{L-1}\right),$$

y=1, 2, . . . (L−2).

2. The interleaved flying capacitor multi-level converter as claimed in claim 1, wherein θ1 is one of $$\Delta\text{phase} = x \times \left( \frac{360°}{2 \times (L-1)} \right),$$

where $x = 1, 2, \ldots 2 \times (L-1) - 1$.

3. The interleaved flying capacitor multi-level converter as claimed in claim 1, further comprising (m−2) bridge arms, where m is a positive integer greater than 2, wherein the g-th bridge arm comprises a g-th flying capacitor multi-level circuit, wherein the g-th flying capacitor multi-level circuit comprises a g-th middle node configured to couple to the power source, a g-th upper arm comprising n g-th upper arm switches, a g-th lower arm comprising n g-th lower arm switches, and (n−1) capacitors respectively coupled to the g-th upper arm and the g-th lower arm; wherein a first terminal of the g-th upper arm is configured to couple to the load, and a second terminal of the g-th upper arm is coupled to the first middle node; a first terminal of the g-th lower arm coupled to the g-th middle node, and a second terminal of the g-th upper arm is configured to couple to the load, where g is a positive integer and 2<g<=m, wherein the phase-shifted pulse width modulation signal generation circuit is configured to generate n g-th upper arm switch control signals for controlling the n g-th upper arm switches and n g-th lower arm switch control signals for controlling the n g-th lower arm switches, and a phase angle difference between each g-th upper arm switch control signal and the corresponding g-th lower arm switch control signal is 180 degrees, wherein a phase angle difference between the i-th g-th upper arm switch and the i-th first upper arm switch is (i−1)×θ1, where i is a positive integer and 1≤i≤n, θ1 is not equal to $$\Delta\text{phase}X = y \times \left( \frac{360°}{L-1} \right),$$

$y = 1, 2, \ldots (L-2)$.

4. The interleaved flying capacitor multi-level converter as claimed in claim 3, wherein θ1 for determining the corresponding phase differences for the second bridge arm to the g-th bridge arm is one of $$\Delta\text{phase} = x \times \left( \frac{360°}{m \times (L-1)} \right),$$

and θ1 for determining the corresponding phase differences for the (g+1)-th bridge arm to the m-th bridge arm is not one of $$\Delta\text{phase} = x \times \left( \frac{360°}{m \times (L-1)} \right),$$

where 2<g≤m and x = 1, 2, \ldots m×(L−1)−1.

5. The interleaved flying capacitor multi-level converter as claimed in claim 3, wherein θ1 for determining the corresponding phase differences for the second bridge arm to the m-th bridge arm is one of $$\Delta\text{phase} = x \times \left( \frac{360°}{m \times (L-1)} \right),$$

where $x = 1, 2, \ldots m \times (L-1) - 1$.

6. An interleaved flying capacitor multi-level converter, comprising:

a plurality of bridge arms, each comprises a flying capacitor multi-level circuit; wherein each bridge arm comprises an upper arm and a lower arm coupled at a middle node; the upper arm comprises a plurality of upper arm switches and the lower arm comprises a plurality of lower arm switches; wherein each bridge arm comprises a plurality of capacitors, and each of which is coupled between every two upper arm switches and every two lower arm switches, and a phase-shifted pulse width modulation signal generation circuit configured to generate a plurality of switch control signals to respectively control the plurality of upper arm switches and the plurality of lower arm switches, wherein a phase angle difference between a plurality of first upper arm switch control signals of a first upper arm of a first bridge arm of a plurality of bridge arms is θ3, and a phase angle difference between one of a plurality of first lower arm switch control signals of a first lower arm of the first bridge arm and corresponding one of the plurality of first upper arm switch controls is respectively 180 degrees, wherein a phase angle difference between one of the plurality of first upper arm switch control signals and corresponding one of the plurality of second upper arm switch control signals of a second upper arm of a second bridge arm of the plurality of bridge arms is θ1, and a phase angle difference between one of a plurality of second lower arm switch control signals of a second lower arm of the second bridge arm and corresponding one of the plurality of second upper arm switch control signals is respectively 180 degrees, wherein θ1 is one of $$\Delta\text{phase} = x \times \left( \frac{360°}{m \times (L-1)} \right),$$

where m is the number of the plurality of bridge arms, L is the number of levels of the flying capacitor multi-level circuit, and x = 1, 2, \ldots m×(L−1)−1.

7. The interleaved flying capacitor multi-level converter as claimed in claim 6, wherein θ1 is not equal to $$\Delta\text{phase}X = y \times \left( \frac{360°}{L-1} \right),$$

$y = 1, 2, \ldots (L-2)$.

8. The interleaved flying capacitor multi-level converter as claimed in claim 6, wherein $$\theta 3 = \frac{360°}{(L-1)}.$$

15

9. An operating method of an interleaved flying capacitor multi-level converter for supplying power to a load according to a power source, wherein the interleaved flying capacitor multi-level converter comprises:

a first bridge arm comprising a first flying capacitor multi-level circuit, wherein the first flying capacitor multi-level circuit comprises a first middle node configured to couple to the power source, a first upper arm comprising n first upper arm switches, a first lower arm comprising n first lower arm switches, and (n−1) capacitors respectively coupled to the first upper arm and the first lower arm; wherein a first terminal of the first upper arm is configured to couple to the load, a second terminal of the first upper arm is coupled to the first middle node; a first terminal of the first lower arm is coupled to the first middle node, and a second terminal of the first lower arm is configured to couple to the load, a second bridge arm comprising a second flying capacitor multi-level circuit, wherein the second flying capacitor multi-level circuit comprises a second middle node configured to couple to the power source, a second upper arm comprising n second upper arm switches, a second lower arm comprising n second lower arm switches, and (n−1) capacitors respectively coupled to the second upper arm and the second lower arm; wherein a first terminal of the second upper arm is configured to couple to the load, and a second terminal of the second upper arm is coupled to the second middle node; a first terminal of the second lower arm is coupled to the second middle node, and a second terminal of the second lower arm is configured to couple to the load, and a phase-shifted pulse width modulation signal generation circuit configured to generate a plurality of switch control signals to respectively control the plurality of upper arm switches and the plurality of lower arm switches, wherein n is a positive integer greater than 1, wherein the operating method comprises steps of:

configuring the phase-shifted pulse width modulation signal generation circuit to generate n first upper arm switch control signals for controlling the n first upper arm switches and n first lower arm switch control signals for controlling the n first lower arm switches, and a phase angle difference between each first upper arm switch control signal and the corresponding first lower arm switch control signal is 180 degrees, configuring the phase-shifted pulse width modulation signal generation circuit to generate n second upper arm switch control signals for controlling the n second upper arm switches and n second lower arm switch control signals for controlling the n second lower arm switches, and a phase angle difference between each second upper arm switch control signal and the corresponding second lower arm switch control signal is 180 degrees, wherein a phase angle difference between the h-th first upper arm switch and the 1st first upper arm switch is (h−1)×θ3, where h is a positive integer and 1<h<=n, $$\theta 3 = \frac{360°}{(L-1)},$$

L is the number of levels of the first flying capacitor multi-level circuit and L=n+1,

wherein a phase angle difference between the i-th second upper arm switch and the i-th first upper arm switch is θ1, where i is a positive integer and 1≤i≤n, θ1 is not equal to $$\Delta phase X = y \times \left( \frac{360°}{L-1} \right),$$

y=1, 2, . . . (L−2).

10. The operating method of claim 9, further comprising configuring θ1 to be one of $$phase = x \times \left( \frac{360°}{2 \times (L-1)} \right),$$

where x=1, 2, . . . 2×(L−1)−1.

11. The operating method of claim 9, wherein the interleaved flying capacitor multi-level converter further comprises (m−2) bridge arms, and m is a positive integer greater than 2;

wherein the g-th bridge arm comprises a g-th flying capacitor multi-level circuit, and g is a positive integer and 2<g<=m;

wherein the g-th flying capacitor multi-level circuit comprises a g-th middle node configured to couple to the power source, a g-th upper arm comprising n g-th upper arm switches, a g-th lower arm comprising n g-th lower arm switches, and (n−1) capacitors respectively coupled to the g-th upper arm and the g-th lower arm; wherein a first terminal of the g-th upper arm is configured to couple to the load, and a second terminal of the g-th upper arm is coupled to the first middle node; a first terminal of the g-th lower arm coupled to the g-th middle node, and a second terminal of the g-th upper arm is configured to couple to the load;

wherein the operating method further comprises configuring the phase-shifted pulse width modulation signal generation circuit to generate n g-th upper arm switch control signals for controlling the n g-th upper arm switches and n g-th lower arm switch control signals for controlling the n g-th lower arm switches, and a phase angle difference between each g-th upper arm switch control signal and the corresponding g-th lower arm switch control signal is 180 degrees, wherein a phase angle difference between the i-th g-th upper arm switch and the i-th first upper arm switch is (i−1)×θ1, where i is a positive integer and 1≤i≤n wherein θ1 is not equal to $$\Delta phase X = y \times \left( \frac{360°}{L-1} \right),$$

y=1, 2, . . . (L−2).

12. The operating method of claim 11, further comprising:

configuring the corresponding phase differences θ1 for the second bridge arm to the g-th bridge arm to be one of $$\Delta \text{phase} = x \times \left( \frac{360°}{m \times (L-1)} \right);$$

and configuring the corresponding phase differences $\theta1$ for the (g+1)-th bridge arm to the m-th bridge arm not to be one of $$\Delta \text{phase} = x \times \left( \frac{360°}{m \times (L-1)} \right),$$

where $2 < g \leq m$ and $x = 1, 2, \ldots m \times (L-1)-1$.

13. The operating method of claim 11, further comprising:
configuring the corresponding phase differences $\theta1$ for the second bridge arm to the m-th bridge arm to be one of $$\Delta \text{phase} = x \times \left( \frac{360°}{m \times (L-1)} \right),$$

where $x = 1, 2, \ldots m \times (L-1)-1$.

*   *   *   *   *